United States Patent
Yashiro et al.

(10) Patent No.: US 11,479,246 B2
(45) Date of Patent: Oct. 25, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Katsuya Yashiro, Wako (JP); Ayumu Horiba, Wako (JP); Tadahiko Kanoh, Wako (JP); Chihiro Oguro, Wako (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 64 days.

(21) Appl. No.: 16/924,276

(22) Filed: Jul. 9, 2020

(65) Prior Publication Data
US 2021/0009126 A1 Jan. 14, 2021

(30) Foreign Application Priority Data
Jul. 11, 2019 (JP) .............................. JP2019-129508

(51) Int. Cl.
*B60W 30/14* (2006.01)
*B60W 30/18* (2012.01)
*B60W 30/16* (2020.01)

(52) U.S. Cl.
CPC ........ *B60W 30/143* (2013.01); *B60W 30/162* (2013.01); *B60W 30/18163* (2013.01); *B60W 2420/42* (2013.01)

(58) Field of Classification Search
CPC ............ B60W 30/143; B60W 30/146; B60W 30/162; B60W 30/18163; B60W 2420/42; B60W 60/00; B62D 15/0255; G08G 1/167
See application file for complete search history.

(56) References Cited

U.S. PATENT DOCUMENTS 9,994,219 B2 * 6/2018 Nilsson ................. B60W 40/08
10,370,012 B2 * 8/2019 Brooks ............. B60W 60/0059
(Continued)

FOREIGN PATENT DOCUMENTS

| JP | 10-105880 | 4/1998 |
| JP | 2015-182525 | 10/2015 |

(Continued)

OTHER PUBLICATIONS

Japanese Office Action for Japanese Patent Application No. 2019-129508 dated Mar. 8, 2022.

*Primary Examiner* — Angelina Shudy
(74) *Attorney, Agent, or Firm* — Amin, Turocy & Watson, LLP

(57) ABSTRACT

A vehicle control device includes a recognition unit configured to recognize surrounding conditions of a vehicle, a driving control unit configured to control a speed and a steering of the vehicle on the basis of a result of recognition from the recognition unit, and a reception unit configured to receive an operation of an occupant of the vehicle of selecting on which of a first path and a second path the vehicle is to travel at a branching point through which the vehicle passes. The driving control unit is configured to control the speed and the steering of the vehicle in a plurality of modes with different automation levels, to decrease the automation level at a point before the branching point, and to delay a time at which the automation level is decreased when the operation of selecting one of the first path and the second path is received by the reception unit in comparison with when the operation is not received.

8 Claims, 8 Drawing Sheets

(56) References Cited

U.S. PATENT DOCUMENTS

| | | | | |
|---|---|---|---|---|
| 10,464,575 | B2 * | 11/2019 | Abe | B60W 30/18163 |
| 10,518,769 | B2 * | 12/2019 | Sen | G08G 1/165 |
| 11,027,746 | B2 * | 6/2021 | Aoi | B60W 40/12 |
| 11,200,806 | B2 * | 12/2021 | Ichinokawa | G08G 1/167 |
| 2011/0241862 | A1 * | 10/2011 | Debouk | B60W 50/035 |
| | | | | 340/439 |
| 2013/0253756 | A1 * | 9/2013 | Matsuno | B60W 50/035 |
| | | | | 701/29.2 |
| 2017/0102700 | A1 * | 4/2017 | Kozak | G05D 1/0061 |
| 2017/0160091 | A1 * | 6/2017 | Hwang | G08G 1/166 |
| 2017/0236210 | A1 * | 8/2017 | Kumar | G05D 1/0061 |
| | | | | 705/4 |
| 2017/0315551 | A1 * | 11/2017 | Mimura | B62D 15/025 |
| 2017/0334454 | A1 * | 11/2017 | Abe | B60W 30/143 |
| 2018/0178788 | A1 * | 6/2018 | Ikedo | B60W 50/14 |
| 2018/0329414 | A1 * | 11/2018 | Igarashi | G05D 1/0088 |
| 2019/0056732 | A1 * | 2/2019 | Aoi | B60W 50/082 |
| 2019/0072957 | A1 * | 3/2019 | Fujimura | G05D 1/0061 |
| 2019/0088137 | A1 * | 3/2019 | Yamada | G06V 20/58 |
| 2021/0107522 | A1 * | 4/2021 | Goto | B60W 60/0018 |
| 2021/0284202 | A1 * | 9/2021 | Furumoto | G08B 21/06 |
| 2021/0300366 | A1 * | 9/2021 | Kanoh | B60W 30/165 |
| 2021/0309254 | A1 * | 10/2021 | Murahashi | B60W 60/0011 |

FOREIGN PATENT DOCUMENTS

| | | | | | |
|---|---|---|---|---|---|
| JP | 2016050900 | A | * | 4/2016 | B60W 10/18 |
| JP | 2016-182945 | | | 10/2016 | |
| JP | 2017207967 | A | * | 11/2017 | B60W 10/06 |
| JP | 2018-203013 | | | 12/2018 | |
| WO | WO-2016035485 | A1 | * | 3/2016 | B60W 10/18 |
| WO | 2016/113926 | | | 7/2016 | |
| WO | WO-2018087801 | A | * | 5/2018 | B60W 50/10 |
| WO | WO-2018138768 | A1 | * | 8/2018 | B60W 10/04 |
| WO | WO-2019082980 | A1 | * | 5/2019 | B60Q 1/00 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-129508, filed Jul. 11, 2019, the content of which is incorporated herein by reference.

BACKGROUND OF THE INVENTION

Field of the Invention

The present invention relates to a vehicle control device, a vehicle control method, and a storage medium.

Description of Related Art

In the related art, a technique of allowing a host vehicle to follow a preceding vehicle is known (for example, see Japanese Unexamined Patent Application, First Publication No. 2015-182525).

SUMMARY OF THE INVENTION

When there is a branching point in a travel direction of a host vehicle, the host vehicle may change a driving state of the host vehicle prior to the branching point, but a time at which the driving state is changed is not considered in the related art.

Aspects of the invention have been invented in consideration of the above-mentioned circumstances and an objective thereof is to provide a vehicle control device, a vehicle control method, and a storage medium that can change a driving state of a host vehicle at an appropriate time.

In order to solve the above-mentioned problems and to achieve the above-mentioned objective, the invention employs the following aspects.

(1) A vehicle control device according to an aspect of the invention includes: a recognition unit configured to recognize surrounding conditions of a vehicle; a driving control unit configured to control a speed and a steering of the vehicle on the basis of a result of recognition from the recognition unit; and a reception unit configured to receive an operation of an occupant of the vehicle of selecting on which of a first path and a second path the vehicle is to travel at a branching point through which the vehicle passes, wherein the driving control unit is configured to control the speed and the steering of the vehicle in a plurality of modes with different automation levels, to decrease the automation level at a point before the branching point, and to delay a time at which the automation level is decreased when the operation of selecting one of the first path and the second path is received by the reception unit in comparison with when the operation is not received.

(2) In the aspect of (1), the first path may be a path which branches from a travel lane in which the vehicle is traveling at a predetermined angle or more, and the second path may be a path which is connected to the travel lane in which the vehicle is traveling at an angle less than the predetermined angle.

(3) In the aspect of (1) or (2), the reception unit may be configured to receive the operation while the vehicle is located in a selection area a first distance or more before the branching point or in a selection area from which a time required to reach the branching point is equal to or greater than a first time, and the driving control unit may be configured to decrease the automation level at a point a second distance before the branching point or at a point from which a time required to reach the branching point is equal to or greater than a second time when the operation is received by the reception unit and to decrease the automation level at a point a third distance before the branching point or at a point from which a time required to reach the branching point is equal to or greater than a third time when the operation is not received by the reception unit. Here, the first distance may be greater than the second distance, the second distance may be greater than the third distance, the first time may be greater than the second time, and the second time may be greater than the third time.

(4) In the aspect of any one of (1) to (3), the driving control unit may be configured to decrease the automation level by stopping a mode in which the vehicle travels by following a preceding vehicle at a point before the branching point and to delay a time at which the automation level is decreased when a transit facility or a vehicle stopping place is located before the first path and the operation of selecting the first path is received by the reception unit in comparison with when the operation of selecting the second path is received by the reception unit.

(5) In the aspect of (4), when the transit facility or the vehicle stopping place is located before the first path and the operation of selecting the second path is received by the reception unit, the driving control unit may be configured to advance the time at which the automation level is decreased when the recognition unit recognizes that the preceding vehicle traveling in the same travel lane as the vehicle is traveling offset in a vehicle width direction with respect to the lane center of the travel lane or the center of the vehicle and a direction of the offset is directed to the first path in comparison with when the direction of the offset is directed to the second path.

(6) In the aspect of any one of (1) to (5), the driving control unit may be configured to increase an inter-vehicle distance from a preceding vehicle when the operation of selecting the first path is received by the reception unit.

(7) In the aspect of any one of (1) to (6), the driving control unit is configured to perform control for traveling by following a preceding vehicle of the vehicle at a first automation level prior to the time at which the automation level is decreased, to decrease the automation level to a second automation level which is lower than the first automation level at a point before the branching point, and to delay the time at which the automation level is decreased to the second automation level when the operation of selecting one of the first path and the second path is received by the reception unit in comparison with when the operation is not received.

(8) In the aspect of any one of (1) to (7), the driving control unit may be configured to control the vehicle using at least one of first control based on a lane mark on a travel lane, second control based on a lateral position of a preceding vehicle recognized by the recognition unit, and third control based on the first control and the second control until the vehicle passes through the branching point and to control the vehicle using the second control after the vehicle has passed through the branching point.

(9) A vehicle control method according to an aspect of the invention is performed by a computer and includes: recognizing surrounding conditions of a vehicle; controlling a speed and a steering of the vehicle on the basis of a result of recognition; receiving an operation of an occupant of the vehicle of selecting on which of a first path and a second path the vehicle is to travel at a branching point through which the vehicle passes; controlling the speed and the steering of the vehicle in a plurality of modes with different automation levels; decreasing the automation level at a point before the branching point; and delaying a time at which the automation level is decreased when the operation of selecting one of the first path and the second path is received in comparison with when the operation is not received.

(10) A non-transitory computer-readable storage medium according to an aspect of the invention stores a program causing a computer to perform: recognizing surrounding conditions of a vehicle; controlling a speed and a steering of the vehicle on the basis of a result of recognition; receiving an operation of an occupant of the vehicle of selecting on which of a first path and a second path the vehicle is to travel at a branching point through which the vehicle passes; controlling the speed and the steering of the vehicle in a plurality of modes with different automation levels; decreasing the automation level at a point before the branching point; and delaying a time at which the automation level is decreased when the operation of selecting one of the first path and the second path is received in comparison with when the operation is not received.

According to the aspects of (1) to (10), it is possible to change the driving state of the host vehicle at an appropriate time. The driving state which is being performed can be maintained for a longer time. As a result, it is possible to reduce an occupant's burden and to improve convenience for the occupant.

According to the aspect of (2), it is possible to change the driving state of the host vehicle depending on features of a path which is desired by an occupant of the host vehicle.

According to the aspect of (3), it is possible to change the driving state of the host vehicle at an appropriate time when no operation is performed by an occupant of the host vehicle.

According to the aspect of (4), it is possible to change the driving state of the host vehicle depending on features of a branching road.

According to the aspect of (5), it is possible to change the driving state of the host vehicle depending on a state of a preceding vehicle of the host vehicle.

According to the aspect of (6), it is possible to enhance reaction performance to an interruptive vehicle which interrupts between the host vehicle and a preceding vehicle.

According to the aspect of (8), it is possible to control travel of the host vehicle on the basis of actual traffic conditions after the vehicle has passed through the branching point.

DETAILED DESCRIPTION OF THE INVENTION

Hereinafter, a vehicle control device, a vehicle control method, and a storage medium according to an embodiment of the invention will be described with reference to the accompanying drawings. The following description is based on the premise a country or a region to which the rule of driving on the left-hand side is applied, but right and left may be exchanged with each other in the case of a country or a region to which the rule of driving on the right-hand side is applied.

First Embodiment

Overall Configuration

Figure 1:
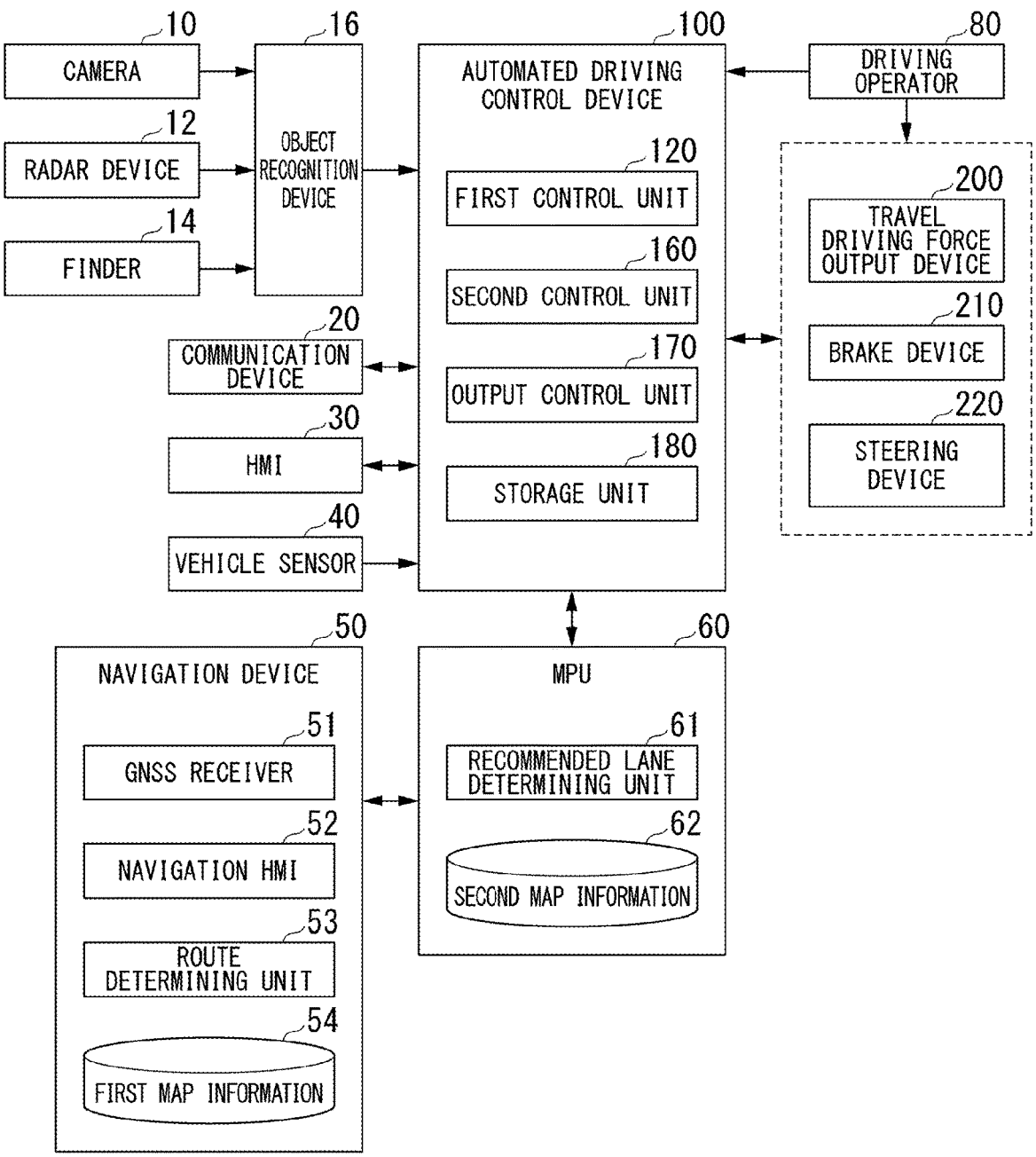
FIG. 1 is a diagram illustrating a configuration of a vehicle system employing a vehicle control device according to a first embodiment.

FIG. 1 is a diagram illustrating a configuration of a vehicle system 1 employing a vehicle control device according to a first embodiment. A vehicle in which the vehicle system 1 is mounted is, for example, a vehicle with two wheels, three wheels, or four wheels and a drive source thereof is an internal combustion engine such as a diesel engine or a gasoline engine, an electric motor, or a combination thereof. An electric motor operates using electric power which is generated by a power generator connected to the internal combustion engine or electric power which is discharged from a secondary battery or a fuel cell.

The vehicle system 1 includes, for example, a camera 10, a radar device 12, a finder 14, an object recognition device 16, a communication device 20, a human-machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or instruments are connected to each other via a multiplex communication line such as a controller area network (CAN) communication line, a serial communication line, a radio communication network, or the like. The configuration illustrated in FIG. 1 is only an example and a part of the configuration may be omitted or another configuration may be added thereto.

The camera 10 is, for example, a digital camera using a solid-state imaging device such as a charge coupled device (CCD) or a complementary metal oxide semiconductor (CMOS). The camera 10 is attached to an arbitrary position on a vehicle (hereinafter, referred to as a host vehicle M) in which the vehicle system 1 is mounted. For example, when the front view of the host vehicle M is imaged, the camera 10 is attached to an upper part of a front windshield, a rear surface of a rearview mirror, or the like. When the rear view of the host vehicle M is imaged, the camera 10 is attached to an upper part of a rear windshield or the like. The camera 10 images surroundings of the host vehicle M, for example, periodically and repeatedly. The camera 10 may be a stereoscopic camera.

The radar device 12 radiates radio waves such as millimeter waves to the surroundings of the host vehicle M, detects radio waves (reflected waves) reflected by an object, and detects at least a position (a distance and a direction) of the object. The radar device 12 is attached to an arbitrary position on the host vehicle M. The radar device 12 may detect a position and a speed of an object using a frequency modulated continuous wave (FM-CW) method.

The finder 14 is a Light Detection and Ranging device (LIDAR). The finder 14 applies light to the surroundings of the host vehicle M and measures scattered light. The finder 14 detects a distance to an object on the basis of a time from emission of light to reception of light. The light which is applied is, for example, a pulse-like laser beam. The finder 14 is attached to an arbitrary position on the host vehicle M.

The object recognition device 16 performs a sensor fusion process on results of detection from some or all of the camera 10, the radar device 12, and the finder 14 and recognizes a position, a type, a speed, and the like of an object. The object recognition device 16 outputs the result of recognition to the automated driving control device 100. The object recognition device 16 may output the results of detection from the camera 10, the radar device 12, and the finder 14 to the automated driving control device 100 without any change. The object recognition device 16 may be omitted from the vehicle system 1.

The communication device 20 communicates with other vehicles near the host vehicle M, for example, using a cellular network, a Wi-Fi network, Bluetooth (registered trademark), or dedicated short range communication (DSRC) or communicates with various server devices via a radio base station.

The HMI 30 presents various types of information to an occupant of the host vehicle M and receives an input operation from the occupant. The HMI 30 includes various display devices, speakers, buzzers, a touch panel, switches, and keys.

The vehicle sensor 40 includes a vehicle speed sensor that detects a speed of the host vehicle M, an acceleration sensor that detects acceleration, a yaw rate sensor that detects an angular velocity around a vertical axis, and a direction sensor that detects a direction of the host vehicle M.

The navigation device 50 includes, for example, a global navigation satellite system (GNSS) receiver 51, a navigation HMI 52, and a route determining unit 53. The navigation device 50 stores first map information 54 in a storage device such as a hard disk drive (HDD) or a flash memory. The GNSS receiver 51 identifies the position of the host vehicle M on the basis of signals received from GNSS satellites. The position of the host vehicle M may be identified or complemented by an inertial navigation system (INS) using the output of the vehicle sensor 40. The navigation HMI 52 includes a display device, a speaker, a touch panel, and keys. A whole or a part of the navigation HMI 52 may be shared by the HMI 30. For example, the route determining unit 53 determines a route (hereinafter, referred to as a route on a map) from the position of the host vehicle M identified by the GNSS receiver 51 (or an input arbitrary position) to a destination input by an occupant using the navigation HMI 52 with reference to the first map information 54. The first map information 54 is, for example, information in which road shapes are expressed by links indicating roads and nodes connected by the links. The first map information 54 may include a curvature of a road or point of interest (POI) information. The route on a map is output to the MPU 60. The navigation device 50 may perform guidance for a route using the navigation HMI 52 on the basis of the route on a map. The navigation device 50 may be realized, for example, by a function of a terminal device such as a smartphone or a tablet terminal which is carried by an occupant. The navigation device 50 may transmit a current position and a destination to a navigation server via the communication device 20 and acquire a route which is equivalent to the route on a map from the navigation server.

The MPU 60 includes, for example, a recommended lane determining unit 61 and stores second map information 62 in a storage device such as an HDD or a flash memory. The recommended lane determining unit 61 divides a route on a map supplied from the navigation device 50 into a plurality of blocks (for example, every 100 [m] in a vehicle travel direction) and determines a recommended lane for each block with reference to the second map information 62. The recommended lane determining unit 61 determines in which lane from the leftmost the host vehicle is to travel. When there is a branching point in the route on a map, the recommended lane determining unit 61 determines a recommended lane such that the host vehicle M travels on a rational route for traveling to a branching destination.

The second map information 62 is map information with higher precision than the first map information 54. The second map information 62 includes, for example, information on the centers of lanes or information on boundaries of lanes. The second map information 62 may include road information, traffic regulation information, address information (addresses and postal codes), facility information, and phone number information. The second map information 62 may be updated from time to time by causing the communication device 20 to communicate with another device.

The driving operator 80 includes, for example, an accelerator pedal, a brake pedal, a shift lever, a steering wheel, a deformed steering, a joystick, a direction indicator lever, a microphone, and various switches. A sensor that detects an amount of operation or performing of an operation is attached to the driving operator 80, and results of detection thereof are output to some or all of the automated driving control device 100, the travel driving force output device 200, the brake device 210, and the steering device 220.

The automated driving control device 100 includes, for example, a first control unit 120, a second control unit 160, an output control unit 170, and a storage unit 180. The first control unit 120 and the second control unit 160 are realized, for example, by causing a hardware processor such as a central processing unit (CPU) to execute a program (software). Some or all of such elements may be realized in hardware (which includes circuitry) such as a large scale integration (LSI), an application specific integrated circuit (ASIC), or a field-programmable gate array (FPGA), or a graphics processing unit (GPU) or may be realized in cooperation of software and hardware. The program may be stored in a storage device such as an HDD or a flash memory of the storage unit 180 in advance, or may be installed in the HDD or the flash memory of the automated driving control device 100 by storing the program in a removable storage medium such as a DVD or a CD-ROM and attaching the removable storage medium to a drive device.

Figure 2:
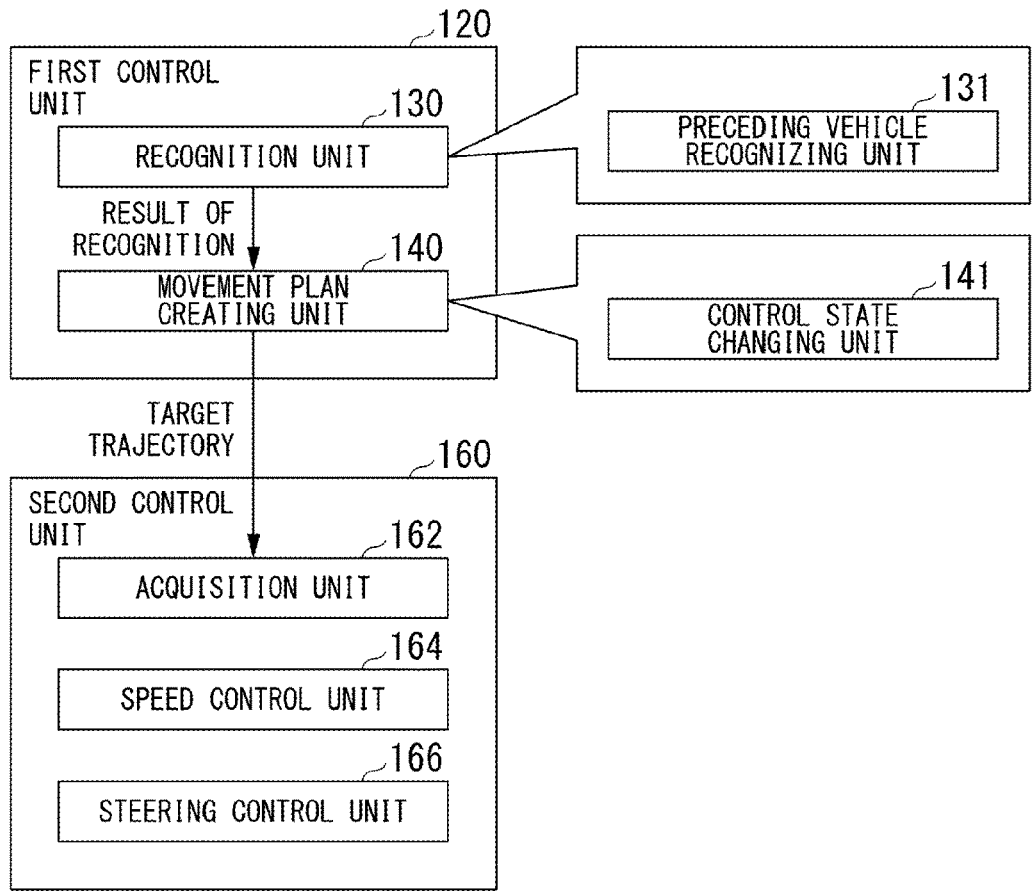
FIG. 2 is a diagram illustrating a functional configuration of a first control unit and a second control unit.

FIG. 2 is a diagram illustrating functional configurations of the first control unit 120 and the second control unit 160. The first control unit 120 includes, for example, a recognition unit 130 and a movement plan creating unit 140. The first control unit 120 is realized, for example, by performing a function based on artificial intelligence (AI) and a function based on a predetermined model together. For example, a function of "recognizing a crossing" may be embodied by performing recognition of a crossing based on deep learning or the like and recognition based on predetermined conditions (such as signals and road signs which can be patternmatched), scoring both recognitions, and comprehensively evaluating both recognitions. Accordingly, reliability of automated driving is secured.

The recognition unit 130 recognizes states such as a position, a speed, and acceleration of an object near the host vehicle M on the basis of information input from the camera 10, the radar device 12, and the finder 14 via the object recognition device 16. Examples of the object include other vehicles. For example, a position of an object is recognized as a position in an absolute coordinate system with an origin set to a representative point of the host vehicle M (such as the center of gravity or the center of a drive shaft) and is used for control. A position of an object may be expressed as a representative point such as the center of gravity or a corner of the object or may be expressed as a drawn area. A "state" of an object may include an acceleration or a jerk of the object or a "moving state" (for example, whether lane change is being performed or whether lane change is going to be performed) thereof.

The recognition unit 130 recognizes, for example, a lane (a travel lane) in which the host vehicle M is traveling. For example, the recognition unit 130 recognizes the travel lane by comparing a pattern of road markings near the host vehicle M which are recognized from an image captured by the camera 10 with a pattern of road markings (for example, arrangement of a solid line and a dotted line) which are acquired from the second map information 62. The recognition unit 130 is not limited to the road markings, but may recognize the travel lane by recognizing travel road boundaries (road boundaries) including road markings, edges of roadsides, curbstones, medians, and guard rails. In this recognition, the position of the host vehicle M acquired from the navigation device 50 and the result of processing from the INS may be considered. The recognition unit 130 recognizes a stop line, an obstacle, a red signal, a toll gate, or other road events.

The recognition unit 130 recognizes a position or a direction of the host vehicle M with respect to a travel lane at the time of recognition of the travel lane. The recognition unit 130 may recognize, for example, separation of the representative point of the host vehicle M from the lane center and an angle of the travel direction of the host vehicle M with respect to a line formed by connecting the lane centers in the travel direction of the host vehicle M as the position and the direction of the host vehicle M relative to the travel lane. Instead, the recognition unit 130 may recognize a position of the representative point of the host vehicle M relative to one side line of the travel lane (a road marking or a road boundary) or the like as the position of the host vehicle M relative to the travel lane.

The recognition unit 130 may further include a preceding vehicle recognizing unit 131. The preceding vehicle recognizing unit 131 recognizes movements of other vehicles traveling in front of (for example, immediately in front of) the host vehicle M on the basis of an image captured by the camera 10.

The movement plan creating unit 140 creates a target trajectory in which the host vehicle M will travel autonomously (without requiring a driver's operation) in the future such that the host vehicle M travels in a recommended lane determined by the recommended lane determining unit 61 in principle and copes with surrounding circumstances of the host vehicle M. A target trajectory includes, for example, a speed element. For example, a target trajectory is expressed by sequentially arranging points (trajectory points) at which the host vehicle M is to arrive. Trajectory points are points at which the host vehicle M is to arrive at intervals of a predetermined traveling distance (for example, about several [m]) along a road, and a target speed and a target acceleration at intervals of a predetermined sampling time (for example, about below the decimal point [sec]) are created as a part of a target trajectory in addition. Trajectory points may be positions at which the host vehicle M is to arrive at sampling times every predetermined sampling time. In this case, information of a target speed or target acceleration is expressed by intervals between the trajectory points.

The movement plan creating unit 140 may set events of automated driving in creating a target trajectory. The events of automated driving include a constant-speed travel event, a low-speed following travel event in which the host vehicle travels by following a preceding vehicle at a predetermined vehicle speed or less (for example, 60 [km]), a lane change event, a branching event, a merging event, and a take-over event. The movement plan creating unit 140 creates a target trajectory based on events which are started.

The movement plan creating unit 140 includes a control state changing unit 141. The control state changing unit 141 determines (changes) a driving state of the host vehicle M to, for example, one driving state of a first driving state, a second driving state, and a third driving state. The first driving state, the second driving state, and the third driving state descend sequentially in an automation level in control of a vehicle. In other words, a high automation level means that a level at which a vehicle is controlled on the basis of a degree of operation of an occupant on the vehicle is low or that a level of a task of monitoring surroundings of a vehicle required by an occupant is low. The automated driving control device 100 determines whether an occupant is monitoring surroundings. For example, the automated driving control device 100 recognizes a sight line of an occupant of the vehicle or a direction of a face on the basis of an image which is captured using an inside camera which is not illustrated and in which an occupant appears and estimates a surrounding monitoring state of an occupant on the basis of the result of recognition. An example of the first to third driving states will be described below.

For example, the first driving state is a driving state in which the vehicle can automatically control the speed and the steering of the vehicle in a state in which an occupant does not grasp, hold, or touch a steering wheel and a state in which the occupant does not monitor the surroundings of the vehicle. The second driving state is a driving state in which the vehicle can automatically control the speed and the steering of the vehicle in a state in which the occupant does not grasp, hold, or touch the steering wheel when the occupant is monitoring the surroundings of the vehicle. Whether the occupant is grasping, holding, or touching the steering wheel is determined on the basis of the result of detection from a sensor which is not illustrated. The sensor is a sensor that is provided in the steering wheel and detects an electrostatic capacitance. For example, the automated driving control device 100 determines whether the occupant grasps, holds, or touches the steering wheel when the electrostatic capacitance or change of the electrostatic capacitance reaches a predetermined threshold value or a change state on the basis of the result of detection from the sensor.

The first driving state or the second driving state may be, for example, a driving state in which following travel of following a preceding vehicle traveling in front of the host vehicle M is performed. Following travel is control in which the host vehicle M maintains an inter-vehicle distance between the host vehicle M and a preceding vehicle at a predetermined distance (for example, a predetermined distance based on the speed) and follows the preceding vehicle. In the first driving state in which the following travel is performed, when a preceding vehicle which is to be followed is eliminated or when the followed vehicle becomes faster, the driving state transitions to the second driving state. In the first driving state or the second driving state, when the host vehicle M enters a predetermined area (for example, a selection area AR which will be described later), when recognition performance of a sensor reaches its limit, or when visibility in a curve or the like is poor, the driving state transitions to the third driving state. The case in which a preceding vehicle which is to be followed is eliminated includes a case in which the preceding vehicle travels in a direction other than the travel direction of the host vehicle M. Traveling in the other direction means, for example, that a preceding vehicle mr1 travels from a road to a branching road when the host vehicle M travels straight ahead on the road.

The third driving state is, for example, a driving state in which a monitoring task associated with safe driving such as surrounding watching (forward watching or the like) is imposed on at least a driver. The third driving state is, for example, a driving state in which the vehicle can automatically control the speed and the steering in a state in which an occupant grasps or holds the steering wheel and a state in which an occupant is monitoring the surroundings of the vehicle. For example, the third driving state is a driving support control state with a low level (for example, level 0 to level 2). In the third driving state, following travel may be performed.

The third driving state may be a state in which a driver performs manual driving. The third driving state may be a state in which an advanced driver assistance system (ADAS) is operating. In this case, the first driving state and the second driving state are states in which automated driving is being performed. The ADAS is a driving support system such as an adaptive cruise control system (ACC) or a lane keeping assist system (LKAS).

Conditions in which control in the first to third driving states is performed are only examples, and may be arbitrarily set as long as the first driving state, the second driving state, and the third driving state descend sequentially in automation level of a vehicle. For example, some or all of the first to third driving states may be an automated driving state or some or all of the first to third driving states may be a state in which driving support other than the automated driving state is performed. This embodiment may be applied to two or more driving states instead of the three driving states. The first driving state or the second driving state is an example of a "first automation level" and the third driving state is an example of a "second automation level." In a certain driving state out of the first to third driving states, a control state with a high driving automation level may be the "first automation level." In such a driving state, a control state with a low driving automation level may be the "second automation level."

For example, the control state changing unit 141 changes the driving state of the host vehicle M in the first driving state or the second driving state to the third driving state at a branching point through which the host vehicle M passes. The control state changing unit 141 advances or delays the time at which the driving state is changed to the third driving state on the basis of the position of the branching point, the position of the host vehicle M, a state of a preceding vehicle of the host vehicle M, an occupant's operation input to a touch panel of the HMI 30, or the like. The control state changing unit 141 causes the host vehicle M to operate in any one driving state out of the first to third driving states after the host vehicle M has passed through the branching point. Details of conditions when the control state changing unit 141 changes the driving state of the host vehicle M to one of the first to third driving states will be described later.

The second control unit 160 controls the travel driving force output device 200, the brake device 210, and the steering device 220 such that the host vehicle M travels along a target trajectory created by the movement plan creating unit 140 as scheduled.

The second control unit 160 includes, for example, an acquisition unit 162, a speed control unit 164, and a steering control unit 166. The acquisition unit 162 acquires information of a target trajectory (trajectory points) created by the movement plan creating unit 140 and stores the acquired information in a memory (not illustrated). The speed control unit 164 controls the travel driving force output device 200 or the brake device 210 on the basis of a speed element accessory to the target trajectory stored in the memory. The steering control unit 166 controls the steering device 220 on the basis of a curve state of the target trajectory stored in the memory. The processes of the speed control unit 164 and the steering control unit 166 are realized, for example, in combination of feed-forward control and feedback control. For example, the steering control unit 166 performs control in combination of feed-forward control based on a curvature of a road in front of the host vehicle M and feedback control based on separation from the target trajectory. The control state changing unit 141 and the second control unit 160 constitute an example of a "driving control unit" together.

Figure 3:
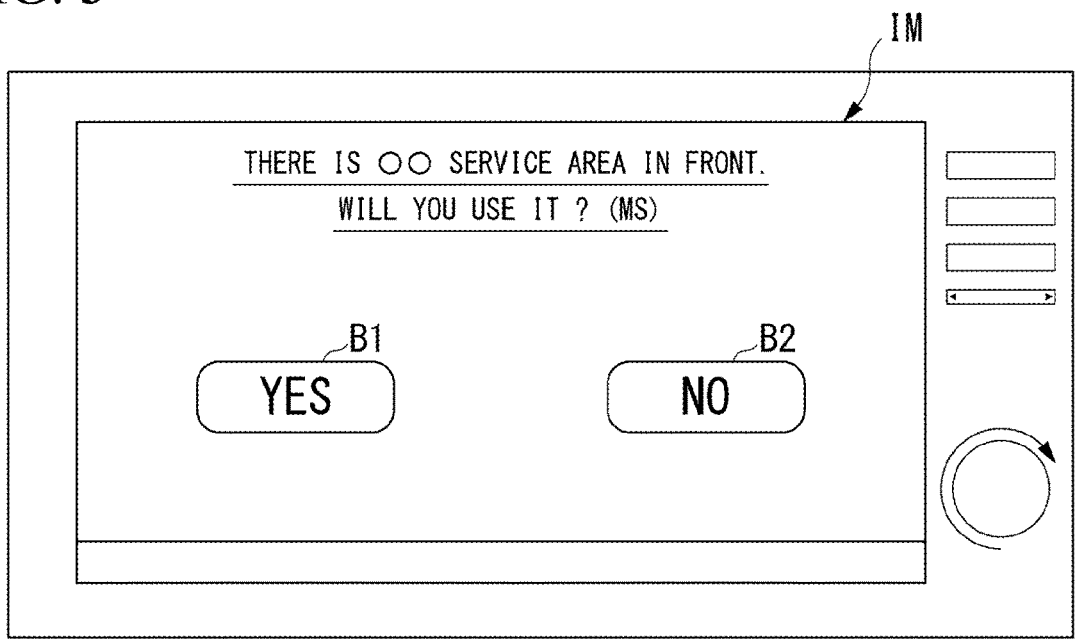
FIG. 3 is a diagram illustrating an example of an inquiry image.

Referring back to FIG. 1, the output control unit 170 controls the HMI 30 such that an occupant is inquired about whether the host vehicle travels in a branching direction, for example, on the basis of a position of a branching point indicated by the first map information 54 and a position of the host vehicle M. FIG. 3 is a diagram illustrating an example of an inquiry image IM. The inquiry image IM is an image which is used to inquire of an occupant about whether the host vehicle travels in a branching direction. The output control unit 170 displays an inquiry image IM on a display device of the HMI 30 when it is determined that the host vehicle M is located in a selection area AR which will be described later on the basis of the position of the host vehicle M identified by the GNSS receiver 51 and the first map information 54. In FIG. 3, the inquiry image IM includes a message MS for inquiring about whether the host vehicle travels in a branching direction, a button B1 for selecting that the host vehicle travels in a branching direction, and a button B2 for selecting that the host vehicle does not travel in a branching direction. At an end of a branching road, for example, a transit facility such as a service area or a vehicle stopping place such as a parking area is provided. Accordingly, the message MS is a message such as "There is a OO service area in front. Will you use it?" The HMI 30 receives an operation of an occupant of the host vehicle M who touches the position of the button B1 or the button B2 in a state in which the inquiry image IM is displayed. The HMI 30 is an example of a "reception unit."

The travel driving force output device 200 outputs a travel driving force (a torque) for allowing the vehicle to travel to the driving wheels. The travel driving force output device 200 includes, for example, a combination of an internal combustion engine, an electric motor, and a transmission and an ECU that controls them. The ECU controls the elements on the basis of information input from the second control unit 160 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of the information input from the second control unit 160 or the information input from the driving operator 80 such that a brake torque based on a braking operation is output to vehicle wheels. The brake device 210 may include a mechanism for transmitting a hydraulic pressure generated by an operation of a brake pedal included in the driving operator 80 to the cylinder via a master cylinder as a backup. The brake device 210 is not limited to the above-mentioned configuration, and may be an electronically controlled hydraulic brake device that controls an actuator on the basis of information input from the second control unit 160 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of the information input from the second control unit 160 or the information input from the driving operator 80 to change the direction of the turning wheels.

Change of Driving State

Figure 4:
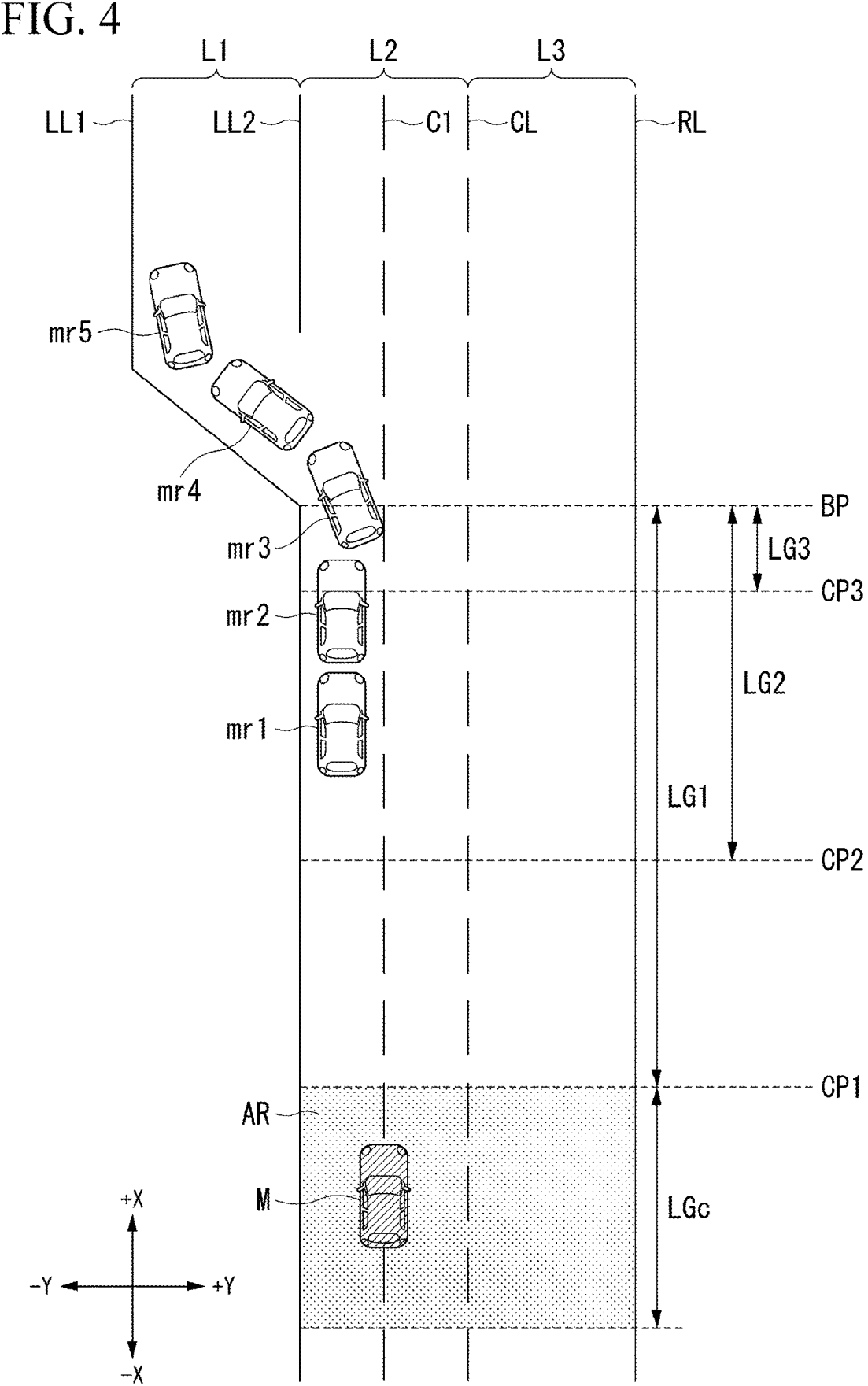
FIG. 4 is a diagram illustrating an example of a scenario in which a driving state is changed.

Process details of the control state changing unit 141 will be described below. FIG. 4 is a diagram illustrating an example of a scenario in which a driving state is changed. In the following description, X represents an extending direction of a road, and Y represents a vehicle width direction which is perpendicular to the X direction. The +X direction represents a travel direction of the host vehicle M, the −X direction represents the side away from the rear of the host vehicle M, the −Y direction represents the left side from the travel direction of the host vehicle M, and the +Y direction represents the right side from the travel direction of the host vehicle M. In the following description, the −X side is also referred to as a "near side" and the +X side is also referred to as a "far side."

Three lanes including a first lane L1, a second lane L2, and a third lane L3 are illustrated in FIG. 4. All the three lanes are lanes in which a vehicle traveling in the +X direction may travel. The first lane L1 is a lane which is located on the leftmost side out of the first to third lanes L1 to L3 and which is defined by a road marking LL1 and a road marking LL2 and is a path which branches leftward from the travel lane in which the host vehicle M is traveling (in this case, the second or third lane L2 to L3) at a predetermined angle or more. The second lane L2 is a lane which is located at the center between the first to third lanes L1 to L3 and which is defined by the road marking LL2 and a road marking CL. The third lane L3 is a lane which his located on the rightmost side out of the first to third lanes L1 to L3 and which is defined by the road marking CL and a road marking RL. The second lane L2 and the third lane L3 are routes which extend from the travel lane in which the host vehicle M is traveling at an angle of less than a predetermined angle. The first lane L1 is an example of a "first path" and the second and third lanes L2 and L3 are an example of a "second path." In the following description, the first lane L1 is also referred to as a "branching road."

In the following description, a position at which the first lane L1 and the second lane L2 branch is referred to as a branching point BP, a position which is a first distance LG1 in the −X direction away from the branching point BP is defined as a first change point CP1, a position which is separated a second distance LG2 in the −X direction from the branching point BP is defined as a second change point CP2, and a position which is separated a third distance LG3 in the −X direction from the branching point BP is defined as a third change point CP3. In the relationship in length between the first to third distances LG1 to LG3, first distance LG1>second distance LG2>third distance LG3 is satisfied. Accordingly, all of the first to third change points CP1 to CP3 are located before the branching point BP, the first change point CP1 out of the first to third change points CP1 to CP3 is farthest from the branching point BP, the third change point CP3 is closest to the branching point BP, and the second change point CP2 is located between the first change point CP1 and the third change point CP3. A range extending a predetermined distance LGc in the −X direction from the first change point CP1 is defined as a selection area AR.

The control state changing unit 141 causes the output control unit 170 to display an inquiry image IM on the display device of the HMI 30 at the selection area AR and determines a time at which the automation level will be decreased (at which the driving state will be changed to the third driving state in this example) on the basis of an operation received via the touch panel of the HMI 30 in response to the display. Accordingly, the predetermined distance LGc defining the range of the selection area AR is such a distance that the host vehicle M travels for a time required until an occupant of the host vehicle M ascertains details of the inquiry image IM after the inquiry image IM is displayed on the display device of the HMI 30 and inputs an operation to the touch panel of the HMI 30.

The lengths of the first to third distance LG1 to LG3 and the predetermined distance LGc may be different from each other depending on features of the branching point BP. Features of the branching point BP are, for example, features associated with a degree of influence on a processing load of the automated driving control device 100 at the branching point BP. When the processing load of the automated driving control device 100 at the branching point BP is estimated to be high, the lengths of the first to third distance LG1 to LG3 and the predetermined distance LGc are likely to be set to be greater than when the processing load is estimated to be low. Regarding the processing load of the automated driving control device 100, the processing load becomes higher as the number of objects which are to be monitored when the automated driving control device 100 controls the host vehicle M becomes greater. For example, when the branching point BP is known as a place in which traffic jams occur often, the lengths of the first to third distance LG1 to LG3 and the predetermined distance LGc may be set to be greater than in a normal case.

In the following description, it is assumed that the host vehicle M travels to a destination which is located at an end of the second lane L2 (or a destination is not set but control for traveling by following a preceding vehicle is performed) and travels by following a preceding vehicle mr1 in the first driving state or the second driving state before and after entering the selection area AR. It is also assumed that the preceding vehicle mr1 is a vehicle traveling to a transit facility such as a service area or a vehicle stopping place such as a parking area before a branching point.

Automation Level is Decreased at First Change Point CP1

When an operation is not received by the HMI 30 (that is, when an occupant of the host vehicle M does not present an intention to travel to the branching road or to travel straight ahead) in response to an inquiry image IM displayed on the display device of the HMI 30 by the output control unit 170 while the host vehicle M is located in the selection area AR, the control state changing unit 141 performs a process of changing the driving state of the host vehicle M to the third driving state at a time at which the position of the host vehicle M identified by the GNSS receiver 51 passes through the first change point CP1.

For example, when another vehicle mr1 which the host vehicle M is following enters a branching road to call in at a parking facility or the like or stops before the tail end of a vehicle sequence in a state in which the automated driving control device 100 does not recognize an occupant's intention as described above, a followed object is eliminated and the driving state transitions to the third driving state. That is, the automation level of the driving state is decreased. When the automation level is forcibly decreased in this way, a margin with which the occupant copes with the decrease of the automation level becomes less. On the other hand, by causing the control state changing unit 141 to decrease the automation level sufficiently before the branching point BP (the first distance LG1 before in this example) through the above-mentioned processes, it is possible to more reliably provide a margin with which the occupant of the host vehicle M copes with the decrease in the automation level.

Automation Level is Decreased at Second Change Point CP2

When an operation instructing to travel straight ahead is received by the HMI 30 in response to the inquiry image IM displayed on the display device of the HMI 30 by the output control unit 170 while the host vehicle M is being located in the selection area AR, the control state changing unit 141 delays the time at which the automation level is decreased in comparison with when the operation is not received. In this case, the control state changing unit 141 performs a process of changing the driving state of the host vehicle M to the third driving state at a time at which the position of the host vehicle M identified by the GNSS receiver 51 passes through the second change point CP2 which is ahead of the first change point CP1.

Specifically, as illustrated in FIG. 4, in a situation in which a transit facility such as a service area or a vehicle stopping place such as a parking area before the branching point is congested and a traffic jam line is present at a position before the third change point CP3 on the second lane L2 and ahead of the second change point CP2, a vehicle (another vehicle mr1 in this case) preceding the host vehicle M recognized by the preceding vehicle recognizing unit 131 may be about to join the traffic jam line. In this case, since it is determined that the host vehicle M will travel straight ahead and it can be recognized that control for causing the host vehicle M to travel straight ahead has been performed, the time at which the automation level is decreased can be delayed compared with the time at which the automation level is decreased in a state in which it is not determined to travel straight ahead or to enter the branching road. Through the above-mentioned processes, the control state changing unit 141 can improve convenience for an occupant of the host vehicle M by decreasing the automation level before the vicinity of vehicles in a traffic jam line traveling to the branching road.

With the decrease of the automation level, the movement plan creating unit 140 creates a target trajectory which is offset in a branching direction from the lane center at the time at which the host vehicle passes through the second change point CP2 when there is no following vehicle or at a time at which an operation is received from a driver of the host vehicle M when there is a preceding vehicle or a following vehicle, and offsets the host vehicle M. The movement plan creating unit 140 does not offset the host vehicle M but causes the host vehicle M to travel at the lane center (on the center line C1 of the lane L2 which is illustrated in the drawing) until one of two conditions including a condition that the host vehicle has passed through the second change point CP2 and a condition that an operation has been received from a driver of the host vehicle M is satisfied.

Automation Level is Decreased at Third Change Point CP3

When an operation instructing to travel to the branching road is received by the HMI 30 in response to the inquiry image IM displayed on the display device of the HMI 30 by the output control unit 170 while the host vehicle M is located in the selection area AR, the control state changing unit 141 delays the time at which the automation level is decreased in comparison with when the operation instructing to travel straight ahead is received. In this case, the control state changing unit 141 performs a process of changing the driving state of the host vehicle M to the third driving state at a time at which the position of the host vehicle M identified by the GNSS receiver 51 passes through the third change point CP3 which is ahead of the second change point CP2. When the host vehicle M reaches the tail end of the traffic jam line in the branching road, the control state changing unit 141 controls the host vehicle M such that the host vehicle M follows a preceding vehicle.

Here, when the host vehicle M follows a preceding vehicle and there is a branching point in the travel direction of the host vehicle M, the host vehicle M ends control for following the preceding vehicle before the branching point. When there is a traffic jam before the branching point due to vehicles traveling to the branching road, or the like, and control for following the preceding vehicle is ended before the branching point, an occupant of the host vehicle M has to control the host vehicle M such that the host vehicle follows the preceding vehicle until the host vehicle M passes through the branching point and thus the occupant may feel burdened.

For example, when the host vehicle M travels to the branching road along with the preceding vehicle in a situation in which a traffic jam line is present at a position before the third change point CP3 and after the second change point CP2 in the second lane L2 as illustrated in FIG. 4 and the driving state of the host vehicle M is changed to the third driving state at the first change point CP1 or the second change point CP2, an occupant of the host vehicle M may be requested to control the host vehicle M even in congestion and feel burdened. On the other hand, the control state changing unit 141 can decrease a burden on an occupant of the host vehicle M and improve convenience for the occupant by not decreasing but maintaining the automation level until passing through a point immediately before the branching point BP (the third change point CP3 in this example) and decreasing the automation level of the host vehicle M at the time at which the host vehicle M passes through the third change point CP3 through the above-mentioned processes. When the center axis of another vehicle mr1 is offset a predetermined value or more from the center in the lateral direction of the second lane L2 toward the branching road, the control state changing unit 141 may determine that the other vehicle mr1 is a vehicle entering the branching road. By this determination, it is possible to more smoothly control the host vehicle M.

Automation Level is Decreased on the Basis of State of Preceding Vehicle

In the above description, when an operation instructing to travel straight ahead is received by the HMI 30, the driving state of the host vehicle M is changed to the third driving state at the time at which the host vehicle M passes through the second change point CP2, but the invention is not limited thereto. For example, when the operation instructing to travel straight ahead is received, the control state changing unit 141 may decrease the automation level on the basis of a state of a preceding vehicle (another vehicle mr1 in this example) recognized by the preceding vehicle recognizing unit 131.

Figure 5:
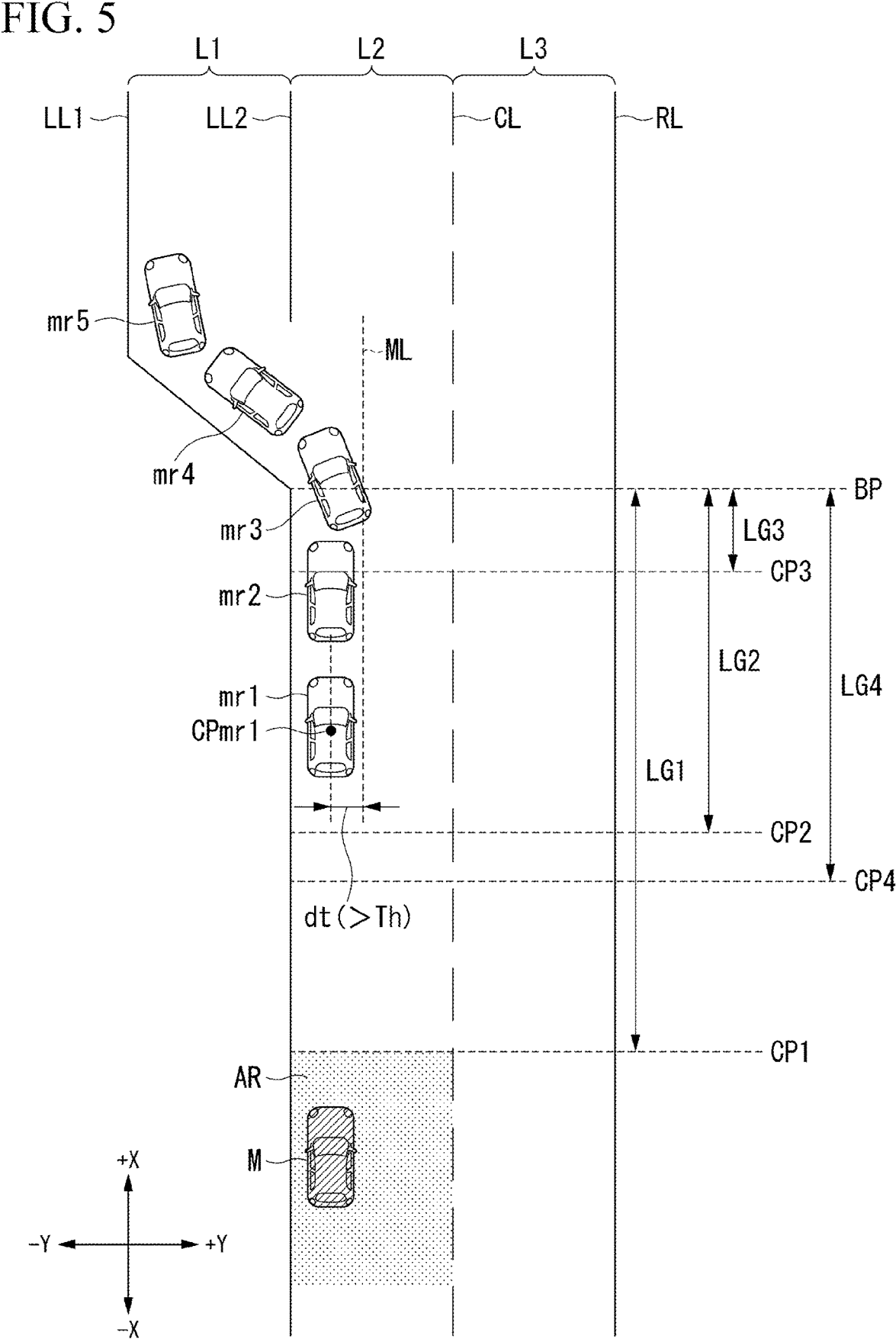
FIG. 5 is a diagram illustrating an example of a scenario in which a driving state is changed on the basis of a state of a preceding vehicle.

FIG. 5 is a diagram illustrating an example of a scenario in which the driving state is changed on the basis of the state of a preceding vehicle. In FIG. 5, the preceding vehicle recognizing unit 131 recognizes in which direction of the +Y direction and the −Y direction and to what extent a preceding vehicle is offset with respect to the lane center ML of the travel lane of the host vehicle M (the second lane L2 in this case) or the center CPmr1 of the other vehicle mr1 (that is, an offset direction and an offset amount dt).

When an operation instructing to travel straight ahead is received by the HMI 30, the offset direction of the other vehicle mr1 recognized by the preceding vehicle recognizing unit 131 is the −Y direction (that is, the first path side), and the offset amount dt is greater than a predetermined threshold value Th, there is a high likelihood that the other vehicle mr1 will join the traffic jam line and thus the control state changing unit 141 advances the time at which the automation level is decreased in comparison with when the offset direction is the +Y direction (that is, the second path side). In this case, the control state changing unit 141 performs a process of changing the driving state of the host vehicle M to the third driving state at the time at which the position of the host vehicle M identified by the GNSS receiver 51 passes through a fourth change point CP4 which is a fourth distance LG4 before the branching point BP. The fourth distance LG4 is, for example, a distance which is greater than the second distance LG2 (a distance which is greater than the second distance LG2 and less than the first distance LG1). Accordingly, the fourth change point CP4 is a position before the second change point CP2. Due to the processing as above, when a host vehicle is traveling straight ahead and a preceding vehicle is about to join the end of traffic jam line for a branching road, the control state changing unit 141 allows an occupant of the host vehicle M to prepare for branching by decreasing the automation level earlier.

Process Using Required Time

In the above description, the change point CP is determined on the basis of the distance to the branching point BP (the first distance LG1, the second distance LG2, and the third distance LG3), but the invention is not limited thereto. The change point CP may be determined, for example, on the basis of a time required to reach the branching point BP. In this case, the first change point CP1 is a position at which the time required to reach the branching point BP is equal to or greater than a first time, the second change point CP2 is a position at which the time required to reach the branching point BP is equal to or greater than a second time, the third change point CP3 is a position at which the time required to reach the branching point BP is equal to or greater than a third time, and the fourth change point CP4 is a position at which the time required to reach the branching point BP is equal to or greater than a fourth time. The relationship between the time lengths satisfies first time>second time>fourth time>third time.

Inter-Vehicle Distance to Preceding Vehicle when Traveling to a Branching Road

When the host vehicle travels to the branching road, it has been described above that the control state changing unit 141 controls the host vehicle M such that the host vehicle M follows a preceding vehicle until the host vehicle passes through the third change point CP3, and the control state changing unit 141 increases the inter-vehicle distance with respect to the preceding vehicle in comparison with a case in which the host vehicle travels by following the preceding vehicle normally. Normal traveling by following a preceding vehicle means, for example, that the host vehicle M travels by following the preceding vehicle before the host vehicle passes through the first change point CP1. For example, in a situation in which there is a traffic jam line due to vehicles traveling to a branching road, another vehicle is likely to interfere. The control state changing unit 141 can enhance the performance of responding to another interfering vehicle by increasing an inter-vehicle distance with respect to a preceding vehicle in comparison with a normal case in this case.

Control after Passing Branching Road

When the position of the host vehicle M identified by the GNSS receiver 51 indicates that the branching point BP has been passed through, the control state changing unit 141 may increase the automation level. For example, the control state changing unit 141 may control the host vehicle M in the second driving state after the host vehicle M has passed through the branching point BP. Accordingly, the control state changing unit 141 can control travelling of the host vehicle M on the basis of actual traffic conditions after passing through the branching point BP.

In the above description, a transit facility such as a service area or a vehicle stopping place such as a parking area before a branching point has been described as being congested, but the above-mentioned processes may be performed even when such a facility or place is not congested. That is, the above-mentioned processes may be performed even when there are no stopped vehicles in the vicinity of the branching road, or the like.

The host vehicle M may perform the above-mentioned processes even when the host vehicle does not travel by following a preceding vehicle mr1 before and after entering the selection area AR.

Operation Flow

Figure 6:
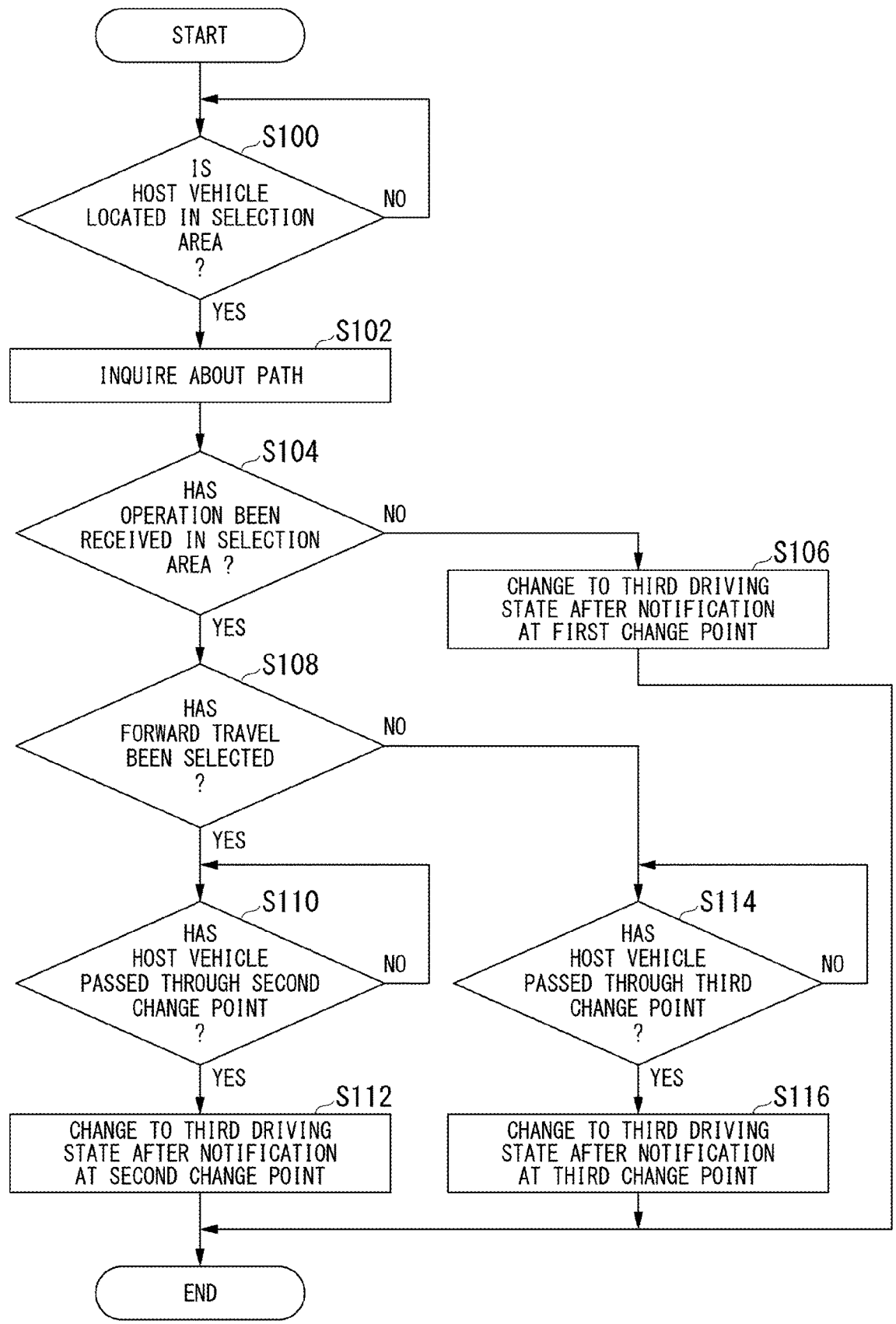
FIG. 6 is a flowchart illustrating an example of a process routine of decreasing an automation level.

FIG. 6 is a flowchart illustrating an example of a process routine of decreasing an automation level. The flowchart illustrated in FIG. 6 is repeatedly performed at intervals of a predetermined time when the driving state of the host vehicle M is the first driving state or the second driving state. First, the output control unit 170 determines whether the host vehicle M is present in a selection area AR on the basis of a position of a branching point indicated by the first map information 54 and the position of the host vehicle M identified by the GNSS receiver 51 (Step S100). The output control unit 170 waits until the host vehicle M reaches the selection area AR. When it is determined that the host vehicle M is present in the selection area AR, the output control unit 170 displays an inquiry image IM on the HMI 30 and inquires of an occupant of the host vehicle M about a path (Step S102). The control state changing unit 141 determines whether an operation of selecting a path has been performed on the HMI 30 by an occupant of the host vehicle M while the host vehicle M is present in the selection area AR (Step S104).

When it is determined that the operation of selecting a path has not been performed on the HMI 30 by the occupant of the host vehicle M while the host vehicle M is present in the selection area AR, the control state changing unit 141 causes the HMI 30 to notify the occupant that the driving state will be changed at the first change point CP1 (that is, a termination of the selection area AR) and performs a process of changing the driving state of the host vehicle M to the third driving state (Step S106). When the occupant does not grasp, hold, or touch the steering wheel within a predetermined time from the notification and the occupant does not monitor the surroundings of the vehicle, the host vehicle M may stop at a safe position.

When it is determined that an operation of selecting a path has been performed on the HMI 30 by the occupant of the host vehicle M while the host vehicle M is present in the selection area AR, the control state changing unit 141 determines whether an operation of selecting traveling straight ahead (that is, not traveling to the branching road) has been performed (Step S108).

When it is determined that straight traveling has been selected by the occupant of the host vehicle M, the control state changing unit 141 determines whether the position of the host vehicle M identified by the GNSS receiver 51 is having passed through the second change point CP2 (Step S110). The control state changing unit 141 waits until the host vehicle M passes through the second change point CP2. When it is determined that the host vehicle M has passed through the second change point CP2, the control state changing unit 141 causes the HMI 30 to notify the occupant that the driving state will be changed and performs process of changing the driving state of the host vehicle M to the third driving state (Step S112).

When it is determined that straight traveling has not been selected by the occupant of the host vehicle M (that is, traveling to the branching road has been selected by the occupant of the host vehicle M), the control state changing unit 141 determines whether the position of the host vehicle M identified by the GNSS receiver 51 has passed through the third change point CP3 (Step S114). The control state changing unit 141 waits until the host vehicle M passes through the third change point CP3. When it is determined that the host vehicle M has passed through the third change point CP3, the control state changing unit 141 causes the HMI 30 to notify the occupant that the driving state is changed and performs process of changing the driving state of the host vehicle M to the third driving state (Step S116).

Operation Flow

Figure 7:
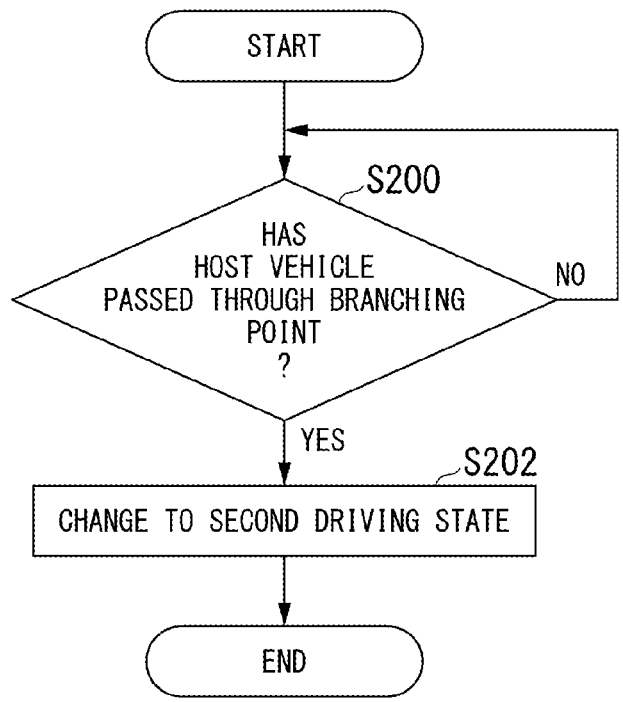
FIG. 7 is a flowchart illustrating an example of a process routine of increasing an automation level.

FIG. 7 is a flowchart illustrating an example of a process routine of increasing an automation level. The control state changing unit 141 determines whether the position of the host vehicle M identified by the GNSS receiver 51 has passed through the branching point BP (Step S200). When it is determined that the host vehicle M has passed through the branching point BP, the control state changing unit 141 performs a process of changing the driving state of the host vehicle M to the second driving state (or the first driving state) (Step S202).

The automated driving control device 100 performs any one of first control, second control, and third control before passing through the branching point BP. The first control is control for causing the automated driving control device 100 to control the host vehicle M on the basis of a relative position between a lane marker on a lane in which the host vehicle M travels and the host vehicle M. The second control is control for causing the automated driving control device 100 to control the host vehicle M on the basis of a lateral position of a preceding vehicle. The second control is control for determining the position at which the host vehicle M is traveling in consideration of a traveling trajectory along which the host vehicle M has traveled. The third control is control which is performed on the basis of both the first control and the second control. The first to third controls are controls which can be performed in the first driving state or the second driving state (or the first driving state, the second driving state, and the third driving state).

As in Step S202 in the flowchart illustrated in FIG. 7, the automated driving control device 100 changes the driving state of the host vehicle M to the second driving state (or the first driving state) and performs second control, when it is determined that the host vehicle M has passed through the branching point BP and there is a preceding vehicle.

Conclusion of First Embodiment

As described above, the automated driving control device 100 according to the first embodiment includes the recognition unit 130, the driving control unit (the movement plan creating unit 140 and the second control unit 160 in this example), and the reception unit (the HMI 30 in this example), and the control state changing unit 141 controls the speed and the steering of the host vehicle M in a plurality of modes with different automation levels, decreases the automation level at a point (the first to fourth change points CP1 to CP4) before the branching point BP, and delays the time at which the automation level is decreased (that is, sets the change point to the second to fourth change points CP2 to CP4) when an operation of selecting one of a first path and a second path is received by the HMI 30 in comparison with when the operation is not received. Accordingly, the automated driving control device 100 according to this embodiment can change the driving state of the host vehicle M at an appropriate time.

Branching Point is Connecting Road Such as Crossing

In the above description, a branching road is a route before which a transit facility such as a service area or a vehicle stopping place such as a parking area is provided, but the invention is not limited thereto. The branching road may be, for example, a connecting road such as a crossing. In this case, when it is determined that the host vehicle travels to the branching road in a route which is determined in advance by the route determining unit 53, the control state changing unit 141 may perform a process of changing the driving state to the third driving state at the third change point CP3 without performing inquiry using the HMI 30 based on the control of the output control unit 170.

Second Embodiment

A second embodiment will be described below. In the first embodiment, it is determined whether an operation of selecting a path has been performed on the HMI 30 by an occupant of the host vehicle M while the host vehicle M is present in the selection area AR. However, in the second embodiment, an operation of selecting a path is performed in advance. Differences from the first embodiment will be described below.

Figure 8:
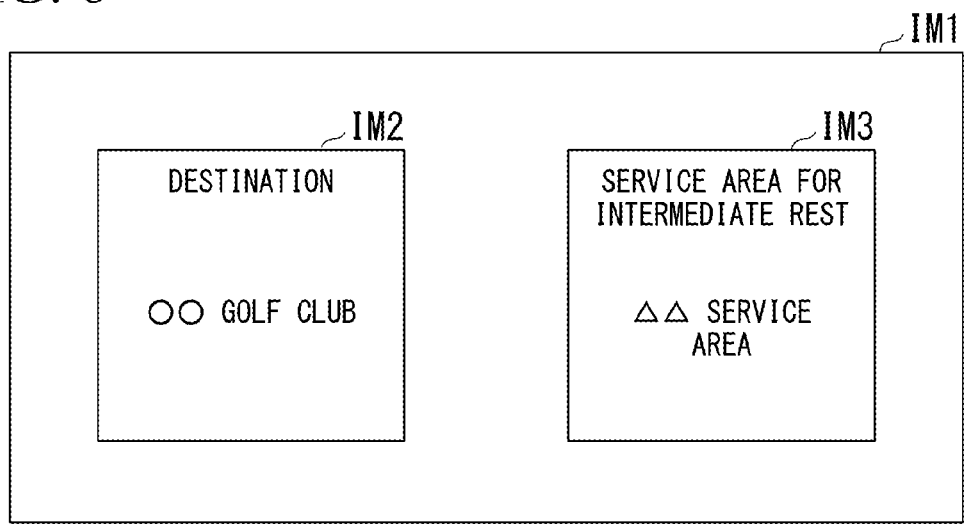
FIG. 8 is a flowchart illustrating an example of an image which is displayed on an HMI.

FIG. 8 is a diagram illustrating an example of an image IM1 which is displayed on the HMI 30. An occupant operates the HMI 30 to set a destination (IM2 in the drawing) or a transit service area (IM3 in the drawing) in a route to the destination, for example, at a departure point in advance. In this way, a destination and a transit service area can be set.

Figure 9:
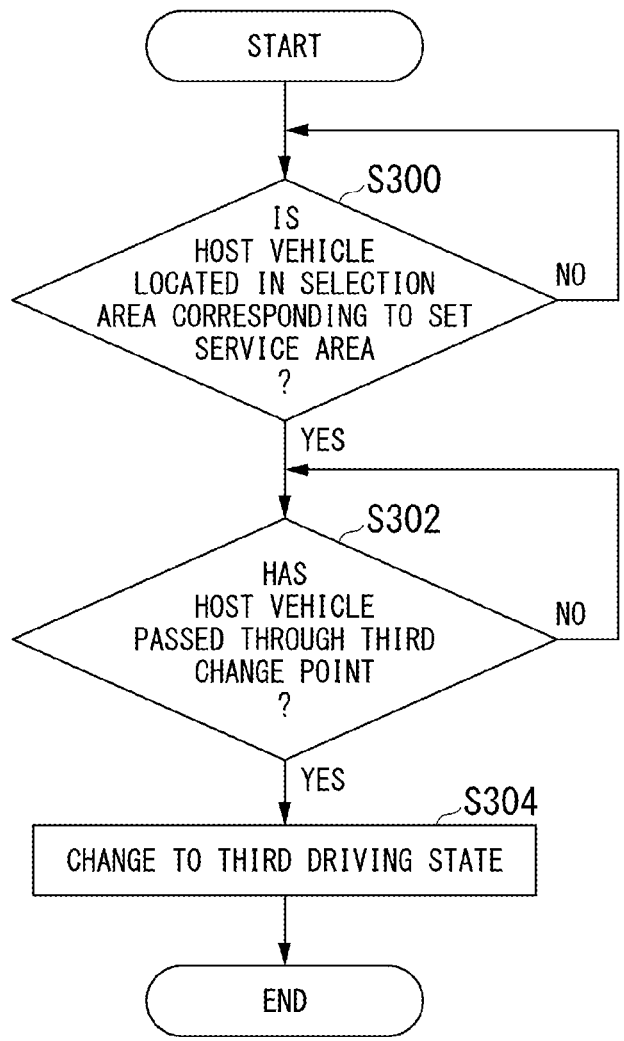
FIG. 9 is a flowchart illustrating an example of a process routine of decreasing an automation level according to a second embodiment.

FIG. 9 is a flowchart illustrating an example of a process routine of decreasing an automation level according to the second embodiment. The process routine in the flowchart is performed when a transit service area or the like in a route to a destination is set.

First, the output control unit 170 determines whether the host vehicle M is present in a selection area AR associated with the set service area on the basis of positions of the set service area and a branching point indicated by the first map information 54 and the position of the host vehicle M identified by the GNSS receiver 51 (Step S300). When it is determined that the host vehicle M is present in the selection area AR associated with the set service area, the control state changing unit 141 waits until the host vehicle M passes through the third change point CP3 (Step S302). When it is determined that the host vehicle M has passed through the third change point CP3, the control state changing unit 141 causes the HMI 30 to notify the occupant that the driving state is changed and performs a process of changing the driving state of the host vehicle M to the third driving state (Step S304).

The same advantages as in the first embodiment can be achieved through the above-mentioned process routine.

For example, when an occupant sets only a destination and does not set a transit service area, the control state changing unit 141 may consider that straight traveling is selected by the occupant of the host vehicle M and change the driving state to the third driving state at the second change point. In this case, the process of inquiring about a path when the host vehicle M is present in the selection area may be omitted.

When a destination or a service area is set in advance, the automated driving control device 100 may perform the process of inquiring about a path as described above with reference to the flowchart illustrated in FIG. 6 (Step S102 in FIG. 6) and then perform the subsequent processes. In this case, an occupant's intention which is acquired in real time has priority to the occupant's intention which is set in advance.

According to the second embodiment described above, the automated driving control device 100 can achieve the same advantages as in the first embodiment by performing the process routine of delaying the time at which the automation level is decreased on the basis of information such as a destination or a service area which is set in advance.

Hardware Configuration

Figure 10:
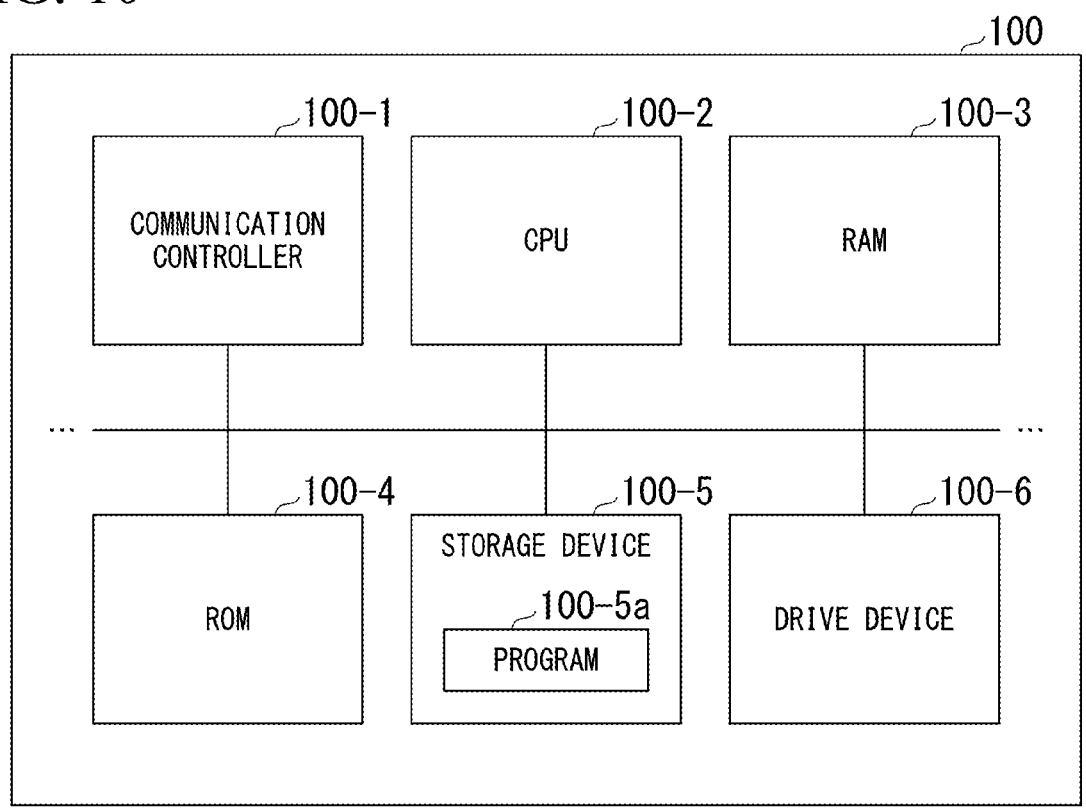
FIG. 10 is a diagram illustrating an example of a hardware configuration of an automated driving control device.

FIG. 10 is a diagram illustrating an example of a hardware configuration of the automated driving control device 100. As illustrated in the drawing, the automated driving control device 100 has a configuration in which a communication controller 100-1, a CPU 100-2, a random access memory (RAM) 100-3 which is used as a work memory, a read only memory (ROM) 100-4 that stores a booting program or the like, a storage device 100-5 such as a flash memory or a hard disk drive (HDD), a drive device 100-6, and the like are connected to each other via an internal bus or a dedicated communication line. The communication controller 100-1 communicates with elements other than the automated driving control device 100. A program 100-5a which is executed by the CPU 100-2 is stored in the storage device 100-5. This program is loaded into the RAM 100-3 by a direct memory access (DMA) controller (not illustrated) or the like and is executed by the CPU 100-2. Accordingly, some or all of the recognition unit 130, the movement plan creating unit 140, and the second control unit 160 are embodied.

The above-mentioned embodiments can be expressed as follows:

a vehicle control device including:
a storage device that stores a program; and
a hardware processor,
wherein the hardware processor is configured to perform:
by executing the program stored in the storage device,
recognizing surrounding conditions of a vehicle;
controlling a speed and a steering of the vehicle on the basis of a result of recognition;
receiving an operation of an occupant of the vehicle of selecting on which of a first path and a second path the vehicle is to travel at a branching point through which the vehicle passes;
controlling the speed and the steering of the vehicle in a plurality of modes with different automation levels;
decreasing the automation level at a point before the branching point; and
delaying a time at which the automation level is decreased when the operation of selecting one of the first path and the second path is received in comparison with when the operation is not received.

While the invention has been described with reference to embodiments, the invention is not limited to the embodiments and can be subjected to various modifications and substitutions without departing from the gist of the invention.

What is claimed is:

1. A vehicle control device comprising:
a processor; and
a memory that stores executable instructions that, when executed by the processor, facilitate performance of operations, comprising:
recognizing surrounding conditions of a vehicle;
controlling a speed and a steering of the vehicle on a basis of a result of recognition from the recognizer; and
receiving an operation of an occupant of the vehicle of selecting on which of a first path and a second path the vehicle is to travel at a branching point through which the vehicle passes, wherein the receiving the operation comprises receiving the operation while the vehicle is located in a selection area a first distance or more before the branching point or in a selection area from which a time required to reach the branching point is equal to or greater than a first time, and
wherein controlling the speed and the steering of the vehicle comprises controlling the speed and the steering in a plurality of modes with different automation levels;
traveling by following a vehicle preceding the vehicle at a first automation level in the selection area; and
decreasing the first automation level at a point before the branching point to a second automation level which is lower than the first automation level, wherein the first automation level comprises an automation level at which the vehicle is controlled on a basis of:
a degree of operation by the occupant on the vehicle that is lower than the degree of operation of the second automation level, or monitoring surroundings of the vehicle required by the occupant requires less attention than the attention required by the second automation level, and
wherein decreasing the first automation level comprises:
decreasing the first automation level at a point a second distance before the branching point or at a point from which a time required to reach the branching point is equal to or greater than a second time when the operation is received; and decreasing the first automation level at a point a third distance before the branching point or at a point from which a time required to reach the branching point is equal to or greater than a third time when the operation is not received by the receiver, wherein the first distance is greater than the second distance, wherein the second distance is greater than the third distance, wherein the first time is greater than the second time, and wherein the second time is greater than the third time.

2. The vehicle control device according to claim 1, wherein the first path is a path which branches from a travel lane in which the vehicle is traveling at a predetermined angle or more, and wherein the second path is a path which is connected to the travel lane in which the vehicle is traveling at an angle less than the predetermined angle.

3. The vehicle control device according to claim 1, wherein decreasing the first automation level further comprises decreasing the automation level by stopping a mode in which the vehicle travels by following a preceding vehicle at a point before the branching point, and wherein the operations further comprise, when a transit facility or a vehicle stopping place is located before the first path and the operation of selecting the first path is received by the receiver, changing the point at which the automation level is decreased to a point closer to the branching point in comparison with when the operation of selecting the second path is received by the receiver.

4. The vehicle control device according to claim 3, wherein the operations further comprise, when the transit facility or the vehicle stopping place is located before the first path and the operation of selecting the second path is received by the receiver, changing the point at which the automation level is decreased, when the recognizer recognizes that the preceding vehicle traveling in the same travel lane as the vehicle is traveling offset in a vehicle width direction with respect to the lane center of the travel lane or the center of the vehicle and a direction of the offset is directed to the first path, to a point further apart from the branching point in comparison with when the direction of the offset is directed to the second path.

5. The vehicle control device according to claim 1, wherein the operations further comprise increasing an inter-vehicle distance from a preceding vehicle when the operation of selecting the first path is received in comparison with the inter-vehicle distance set in the mode in which the vehicle travels by following the preceding vehicle in the selection area.

6. The vehicle control device according to claim 1, wherein the operations further comprise:

controlling the vehicle using at least one of first control based on a lane mark on a travel lane, second control based on a lateral position of a preceding vehicle recognized by the recognizer, and third control based on the first control and the second control until the vehicle passes through the branching point; and controlling the vehicle using the second control after the vehicle has passed through the branching point.

7. A vehicle control method which is performed by a computer, the vehicle control method comprising:

recognizing surrounding conditions of a vehicle;
controlling a speed and a steering of the vehicle on a basis of a result of recognition from the recognizer; and receiving an operation of an occupant of the vehicle of selecting on which of a first path and a second path the vehicle is to travel at a branching point through which the vehicle passes, wherein receiving the operation comprises receiving the operation while the vehicle is located in a selection area a first distance or more before the branching point or in a selection area from which a time required to reach the branching point is equal to or greater than a first time, wherein controlling the speed and the steering of the vehicle comprises controlling the speed and the steering in a plurality of modes with different automation levels;

traveling by following a vehicle preceding the vehicle at a first automation level in the selection area; and decreasing the first automation level at a point before the branching point to a second automation level which is lower than the first automation level, wherein the first automation level comprises an automation level at which the vehicle is controlled on a basis of:

a degree of operation by the occupant on the vehicle that is lower than the degree of operation of the second automation level, or monitoring surroundings of the vehicle required by the occupant requires less attention than the attention required by the second automation level, and wherein decreasing the first automation level comprises:

decreasing the first automation level at a point a second distance before the branching point or at a point from which a time required to reach the branching point is equal to or greater than a second time when the operation is received, and decreasing the first automation level at a point a third distance before the branching point or at a point from which a time required to reach the branching point is equal to or greater than a third time when the operation is not received by the receiver, wherein the first distance is greater than the second distance, wherein the second distance is greater than the third distance, wherein the first time is greater than the second time, and wherein the second time is greater than the third time.

8. A non-transitory computer-readable storage medium comprising executable instructions that, when executed by a processor of a device, facilitate performance of operations, comprising:

recognizing surrounding conditions of a vehicle;
controlling a speed and a steering of the vehicle on a basis of a result of recognition from the recognizer; and receiving an operation of an occupant of the vehicle of selecting on which of a first path and a second path the vehicle is to travel at a branching point through which the vehicle passes, wherein receiving the operation comprises receiving the operation while the vehicle is located in a selection area a first distance or more before the branching point or in a selection area from which a time required to reach the branching point is equal to or greater than a first time, wherein controlling the speed and the steering of the vehicle comprises controlling the speed and the steering in a plurality of modes with different automation levels;

traveling by following a vehicle preceding the vehicle at a first automation level in the selection area; and decreasing the first automation level at a point before the branching point to a second automation level which is lower than the first automation level, wherein the first automation level comprises an automation level at which the vehicle is controlled on a basis of:

a degree of operation by the occupant on the vehicle that is lower than the degree of operation of the second automation level, or monitoring surroundings of the vehicle required by the occupant requires less attention than the attention required by the second automation level, and wherein decreasing the first automation level comprises:

decreasing the first automation level at a point a second distance before the branching point or at a point from which a time required to reach the branching point is equal to or greater than a second time when the operation is received, and decreasing the first automation level at a point a third distance before the branching point or at a point from which a time required to reach the branching point is equal to or greater than a third time when the operation is not received by the receiver, wherein the first distance is greater than the second distance, wherein the second distance is greater than the third distance, wherein the first time is greater than the second time, and wherein the second time is greater than the third time.

\* \* \* \* \*